US008834105B2

(12) United States Patent
Albers et al.

(10) Patent No.: US 8,834,105 B2
(45) Date of Patent: *Sep. 16, 2014

(54) STRUCTURAL LOW-DUCTILITY TURBINE SHROUD APPARATUS

(75) Inventors: Joseph Charles Albers, Fort Wright, KY (US); Mark Willard Marusko, Springboro, OH (US); Barry Allan Wilson, Broken Arrow, OK (US); Aaron Michael Dziech, Cincinnati, OH (US); Christopher Ryan Johnson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 668 days.

This patent is subject to a terminal disclaimer.

(21) Appl. No.: 12/982,082

(22) Filed: Dec. 30, 2010

(65) Prior Publication Data

US 2012/0171027 A1    Jul. 5, 2012

(51) Int. Cl.
  *F01D 25/14* (2006.01)
  *F01D 25/12* (2006.01)
  *F01D 25/24* (2006.01)
  *F01D 11/00* (2006.01)

(52) U.S. Cl.
  CPC ...... *F01D 11/005* (2013.01); *F05D 2300/6033* (2013.01); *F01D 25/12* (2013.01); *F01D 25/246* (2013.01); *F05D 2260/31* (2013.01); *F05D 2260/202* (2013.01)
  USPC ...................................... 415/173.1

(58) Field of Classification Search
  CPC ............. F01D 5/22; F01D 9/02; F01D 9/04; F01D 11/005; F01D 11/08; F01D 25/12; F01D 25/24; F01D 25/246; F01D 25/26; F01D 25/28; F02C 7/00; F02C 7/20; F05D 2260/202; F05D 2300/6033; F05D 2260/31
  USPC ...................................... 415/173.1
  See application file for complete search history.

(56) References Cited

U.S. PATENT DOCUMENTS

| 5,074,748 | A |   | 12/1991 | Hagle |           |
|-----------|---|---|---------|-------|-----------|
| 5,154,577 | A | * | 10/1992 | Kellock et al. | 415/170.1 |
| 5,188,507 | A |   | 2/1993  | Sweeney |         |
| 5,653,581 | A | * | 8/1997  | Dixon et al. | 415/209.2 |
| 5,655,876 | A |   | 8/1997  | Rock et al. |         |

(Continued)

OTHER PUBLICATIONS

Albers, et al.; U.S. Appl. No. 12/821,599, filed Jun. 23, 2010.

(Continued)

*Primary Examiner* — Edward Look
*Assistant Examiner* — Jeffrey A Brownson
(74) *Attorney, Agent, or Firm* — William Scott Andes; Trego, Hines & Ladenheim, PLLC

(57) ABSTRACT

A turbine shroud apparatus for a gas turbine engine having a central axis includes: an arcuate shroud segment comprising low-ductility material and having a cross-sectional shape defined by opposed forward and aft walls, and opposed inner and outer walls, the walls extending between opposed first and second end faces and collectively defining a shroud cavity; and an annular stationary structure surrounding the shroud segment, where the shroud segment is mechanically coupled to the stationary structure. The stationary structure includes at least one axially-facing bearing surface which is in direct contact with the shroud segment, and the shroud segment is disposed so as to absorb at least one axially-aligned force and transfer the axially-aligned force to the bearing surface.

18 Claims, 13 Drawing Sheets

(56) References Cited

U.S. PATENT DOCUMENTS

| | | |
|---|---|---|
| 6,290,459 B1 | 9/2001 | Correia |
| 6,340,285 B1 * | 1/2002 | Gonyou et al. ............... 415/116 |
| 6,413,042 B2 | 7/2002 | Correia |
| 6,503,051 B2 | 1/2003 | Predmore |
| 6,702,550 B2 * | 3/2004 | Darkins et al. ............... 415/139 |
| 7,121,789 B2 * | 10/2006 | Richards .................... 415/173.1 |
| 7,740,443 B2 * | 6/2010 | Seitzer et al. ................ 415/116 |
| 2008/0206046 A1 * | 8/2008 | Razzell et al. ............. 415/173.1 |

OTHER PUBLICATIONS

Marusko, et al.; U.S. Appl. No. 12/790,209, filed May 28, 2010.
Shapiro, et al.; U.S. Appl. No. 12/696,566, filed Jan. 29, 2010.
Dziech, et al.; U.S. Appl. No. 12/895,007 filed Sep. 30, 2010.
Albers, et al.; U.S. Appl. No. 12/915,424, filed Oct. 29, 2010.

* cited by examiner

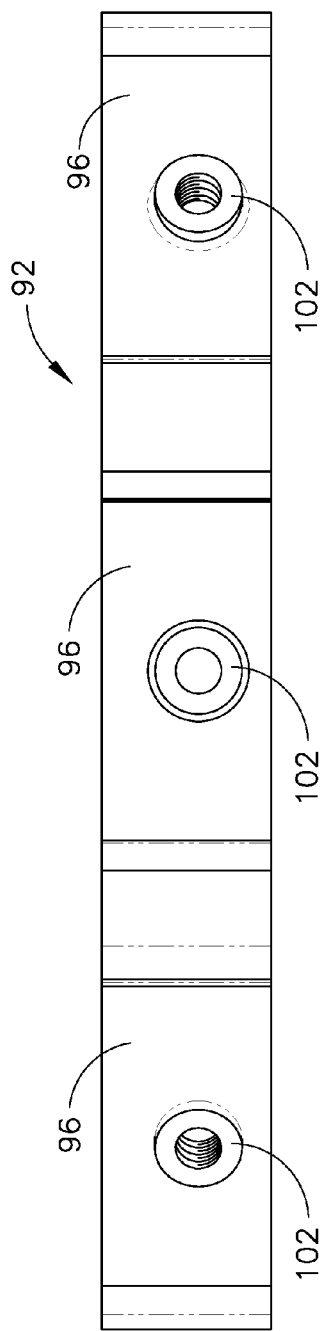
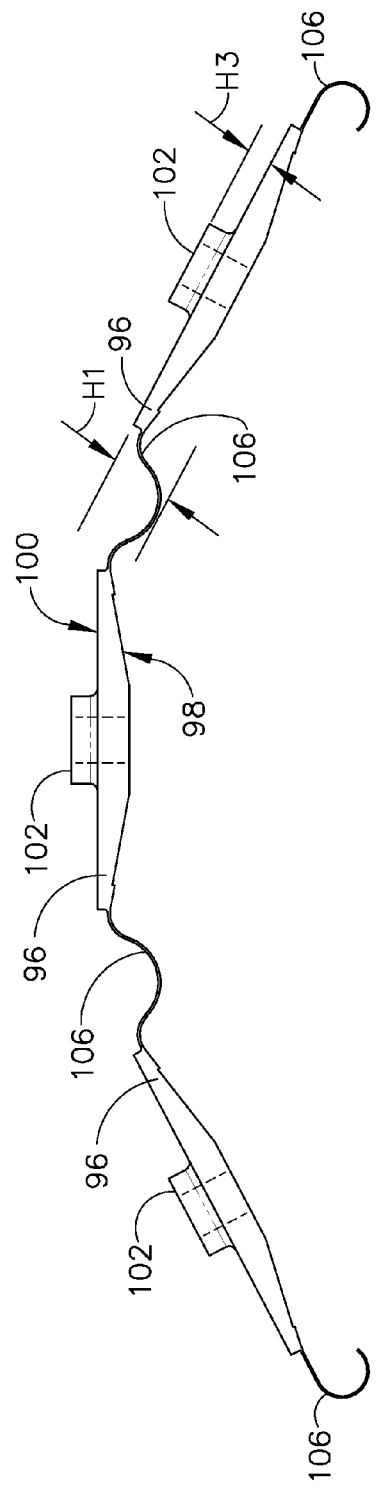

STRUCTURAL LOW-DUCTILITY TURBINE SHROUD APPARATUS

BACKGROUND OF THE INVENTION

This invention relates generally to gas turbine engines, and more particularly to apparatus and methods for mounting shrouds made of a low-ductility material in the turbine sections of such engines.

A typical gas turbine engine includes a turbomachinery core having a high pressure compressor, a combustor, and a high pressure turbine in serial flow relationship. The core is operable in a known manner to generate a primary gas flow. The high pressure turbine (also referred to as a gas generator turbine) includes one or more rotors which extract energy from the primary gas flow. Each rotor comprises an annular array of blades or buckets carried by a rotating disk. The flowpath through the rotor is defined in part by a shroud, which is a stationary structure which circumscribes the tips of the blades or buckets. These components operate in an extremely high temperature environment.

It has been proposed to replace metallic shroud structures with materials having better high-temperature capabilities, such as ceramic matrix composites (CMCs). These materials have unique mechanical properties that must be considered during design and application of an article such as a shroud segment. For example, CMC materials have relatively low tensile ductility or low strain to failure when compared with metallic materials. Also, CMCs have a coefficient of thermal expansion ("CTE") in the range of about 1.5-5 microinch/inch/degree F., significantly different from commercial metal alloys used as supports for metallic shrouds. Such metal alloys typically have a CTE in the range of about 7-10 microinch/inch/degree F.

Conventional metallic shrouds are often mounted to the surrounding structure using hangers or other hardware having complex machined features such as slots, hooks, or rails. CMC shrouds are not generally amenable to the inclusion of such features, and are also sensitive to concentrated loads imposed thereby.

Accordingly, there is a need for a mounting apparatus for low-ductility turbine components to metallic supporting hardware while accommodating varied thermal characteristics and without imposing excessive concentrated loads or thermal stresses.

BRIEF SUMMARY OF THE INVENTION

This need is addressed by the present invention, which provides a turbine shroud mounting apparatus including a low-ductility shroud segment which forms parts of a structural load path.

According to one aspect of the invention, a turbine shroud apparatus for a gas turbine engine having a central axis includes: an arcuate shroud segment comprising low-ductility material and having a cross-sectional shape defined by opposed forward and aft walls, and opposed inner and outer walls, the walls extending between opposed first and second end faces and collectively defining a shroud cavity; and an annular stationary structure surrounding the shroud segment, where the shroud segment is mechanically coupled to the stationary structure. The stationary structure includes at least one axially-facing bearing surface which is in direct contact with the shroud segment, and the shroud segment is disposed so as to absorb at least one axially-aligned force and transfer the axially-aligned force to the bearing surface.

According to another aspect of the invention, a turbine shroud apparatus for a gas turbine engine having a central axis includes: an annular array of arcuate shroud segments comprising low-ductility material and having a cross-sectional shape defined by opposed forward and aft walls, and opposed inner and outer walls, the walls extending between opposed first and second end faces and collectively defining a shroud cavity, the end faces of adjacent shroud segments being disposed in sealing relationship to each other; an annular stationary structure surrounding the array of shroud segments, where the shroud segments are mechanically coupled to the stationary structure. Flowpaths are defined for cooling air to enter and exit the shroud cavity.

BRIEF DESCRIPTION OF THE DRAWINGS

The invention may be best understood by reference to the following description taken in conjunction with the accompanying drawing figures in which:

FIG. 7 is a top plan view of the load spreader of FIG. 6;

FIG. 8 is a front elevational view of the load spreader of FIG. 6;

DETAILED DESCRIPTION OF THE INVENTION

Figure 1:
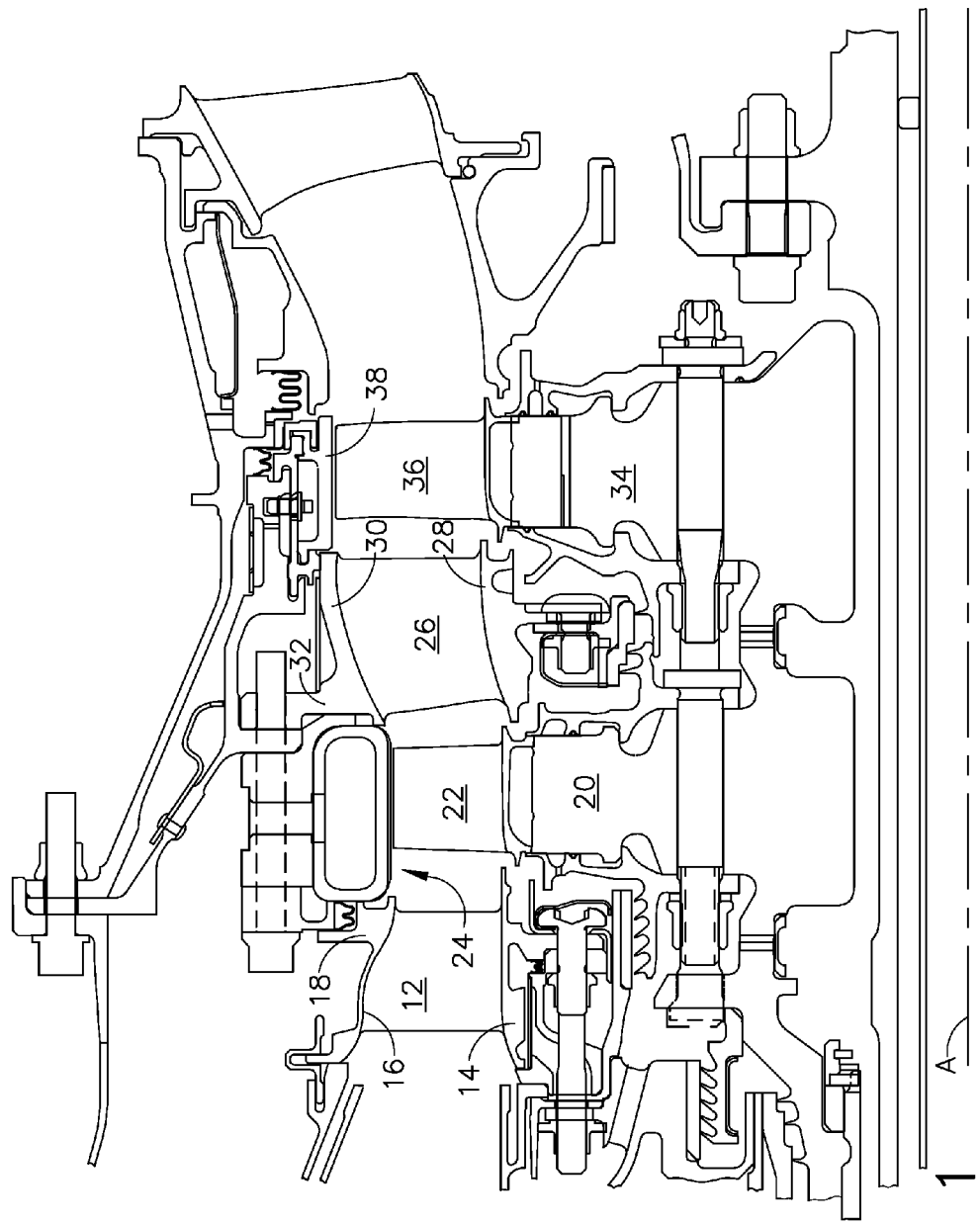
FIG. 1 is a schematic cross-sectional view of a portion of a turbine section of a gas turbine engine, incorporating a turbine shroud assembly and mounting apparatus constructed in accordance with an aspect of the present invention.

Referring to the drawings wherein identical reference numerals denote the same elements throughout the various views, FIG. 1 depicts a portion of a gas generator turbine ("GGT"), which is part of a gas turbine engine of a known type. The function of the GGT is to extract energy from high-temperature, pressurized combustion gases from an upstream combustor and to convert the energy to mechanical work, in a known manner. The GGT drives a compressor (not shown) located upstream of the combustor through a shaft so as to supply pressurized air to the combustor.

In the illustrated example, the engine is a turboshaft engine and a work turbine would be located downstream of the GGT and coupled to a shaft driving a gearbox, propeller, or other external load. However, the principles described herein are equally applicable to turbojet and turbofan engines, as well as turbine engines used for other vehicles or in stationary applications.

The GGT includes a first stage nozzle which comprises a plurality of circumferentially spaced airfoil-shaped hollow first stage vanes 12 that are circumscribed by arcuate, segmented inner and outer bands 14 and 16. An annular flange 18 extends radially outward at the aft end of the outer band 16. The first stage vanes 12 are configured so as to optimally direct the combustion gases to a downstream first stage rotor.

The first-stage rotor includes a disk 20 that rotates about a centerline axis "A" of the engine and carries an array of airfoil-shaped first stage turbine blades 22. A shroud comprising a plurality of arcuate shroud segments 24 is arranged so as to closely surround the first stage turbine blades 22 and thereby define the outer radial flowpath boundary for the hot gas stream flowing through the first stage rotor.

A second stage nozzle is positioned downstream of the first stage rotor. It comprises a plurality of circumferentially spaced airfoil-shaped hollow second stage vanes 26 that are circumscribed by arcuate, segmented inner and outer bands 28 and 30. An annular flange 32 extends radially outward at the forward end of the outer band 30.

The second stage rotor includes a disk 34 that rotates about a centerline axis of the engine and carries an array of airfoil-shaped second stage turbine blades 36. A shroud comprising a plurality of arcuate shroud segments 38 is arranged so as to closely surround the second stage turbine blades 36 and thereby define the outer radial flowpath boundary for the hot gas stream flowing through the second stage rotor. The first and second stage rotors are mechanically coupled together and drive an upstream compressor of a known type (not shown).

Figure 2:
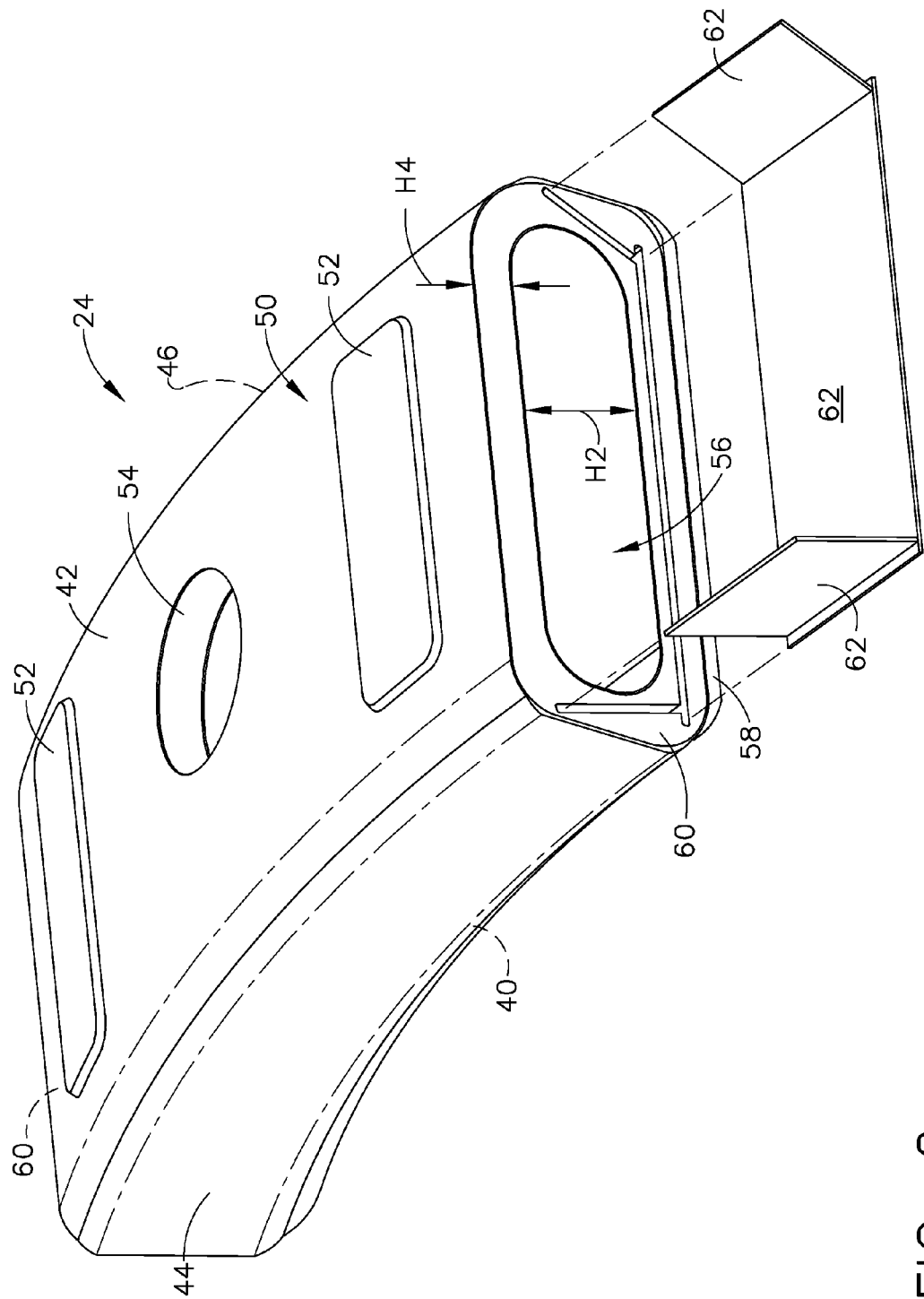
FIG. 2 is an exploded perspective view of a turbine shroud constructed in accordance with an aspect of the present invention, shown with several spline seals.

As seen in FIG. 2, each shroud segment 24 has a generally rectangular or "box"-shaped hollow cross-sectional shape defined by opposed inner and outer walls 40 and 42, and forward and aft walls 44 and 46. In the illustrated example radiused transitions are provided between the walls, but sharp or square-edged transitions may be used as well. The shroud segment 24 has a radially inner flowpath surface 48 (see FIG. 3) and a radially outer back surface 50. The back surface 50 may incorporate one or more protruding pads 52 which can be used for alignment purposes. A mounting hole 54 passes through the outer wall 42. A shroud cavity 56 is defined within the walls 40, 42, 44, and 46. With the exception of the mounting hole 54, the shroud segment 24 forms a closed structural box capable of transferring significant loads, as described in more detail below.

The shroud segments 24 are constructed from a ceramic matrix composite (CMC) material of a known type. Generally, commercially available CMC materials include a ceramic type fiber for example SiC, forms of which are coated with a compliant material such as Boron Nitride (BN). The fibers are carried in a ceramic type matrix, one form of which is Silicon Carbide (SiC). Typically, CMC type materials have a room temperature tensile ductility of no greater than about 1%, herein used to define and mean a low tensile ductility material. Generally CMC type materials have a room temperature tensile ductility in the range of about 0.4 to about 0.7%. This is compared with metals having a room temperature tensile ductility of at least about 5%, for example in the range of about 5 to about 15%. The shroud segments 24 could also be constructed from other low-ductility, high-temperature-capable materials.

The flowpath surface 48 of the shroud segment 24 may incorporate a layer of environmental barrier coating ("EBC"), an abradable material, and/or a rub-tolerant material 58 of a known type suitable for use with CMC materials. This layer is sometimes referred to as a "rub coat". In the illustrated example, the layer 58 is about 0.51 mm (0.020 in.) to about 0.76 mm (0.030 in.) thick.

The shroud segments 24 include opposed end faces 60 (also commonly referred to as "slash" faces). Each of the end faces 60 lies in a plane parallel to the centerline axis A of the engine, referred to as a "radial plane". They may also be oriented so that the plane is at an acute angle to such a radial plane. When assembled and mounted to form an annular ring, end gaps are present between the end faces 60 of adjacent shroud segments 24. Accordingly, an array of seals 62 are provided at the end faces 60. Similar seals are generally known as "spline seals" and take the form of thin strips of metal or other suitable material which are inserted in slots in the end faces 60. The spline seals 62 span the gap.

Figure 3:
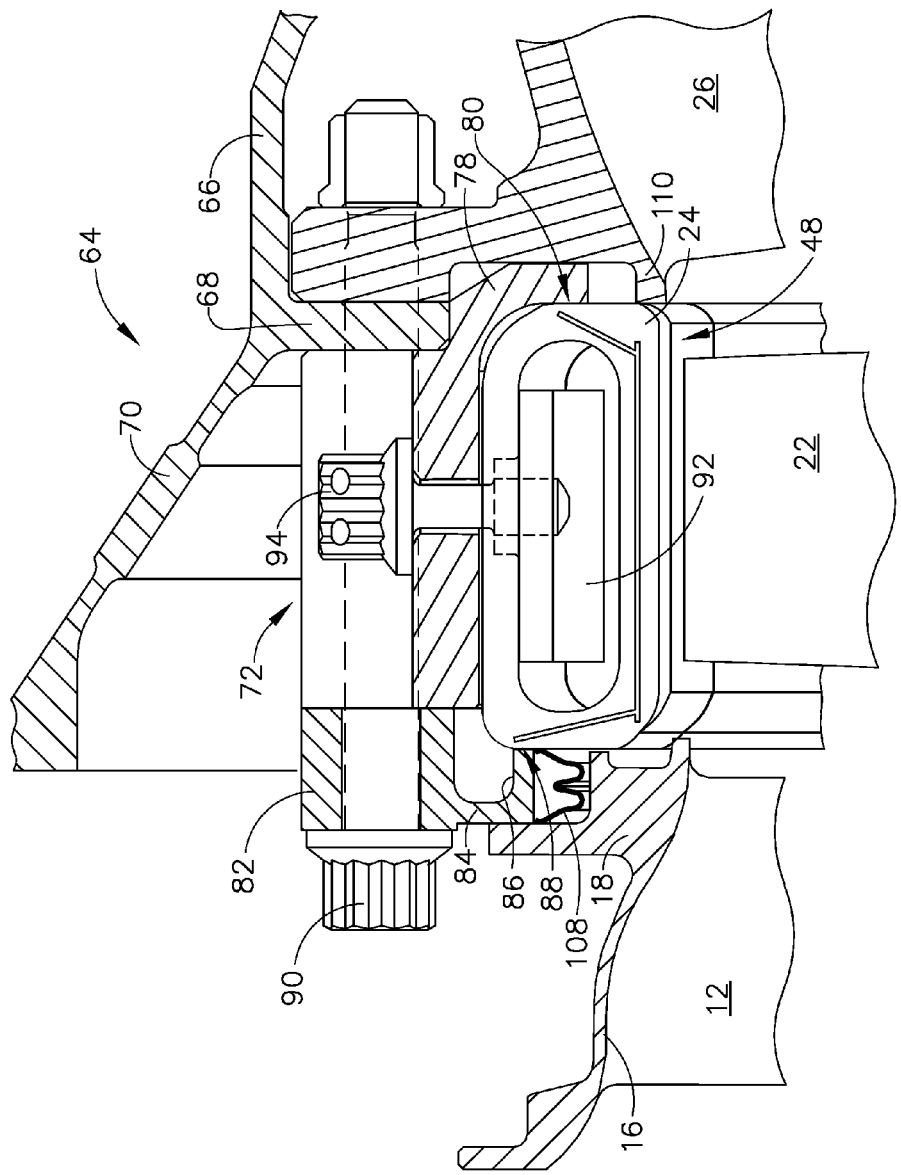
FIG. 3 is an enlarged view of a portion of FIG. 1.
Figure 4:
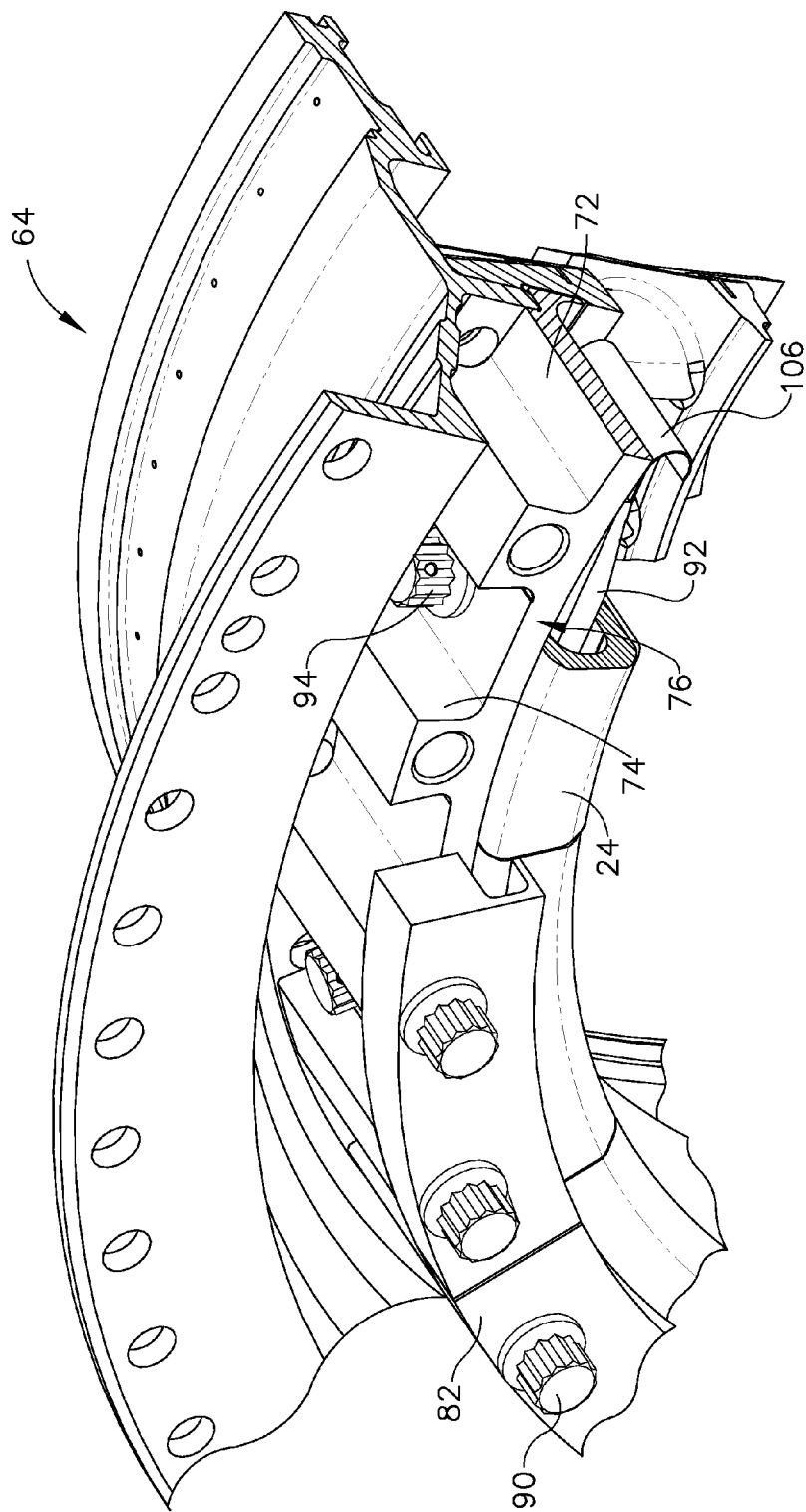
FIG. 4 is a perspective view of a portion of the turbine shroud assembly of FIG. 1.
Figure 5:
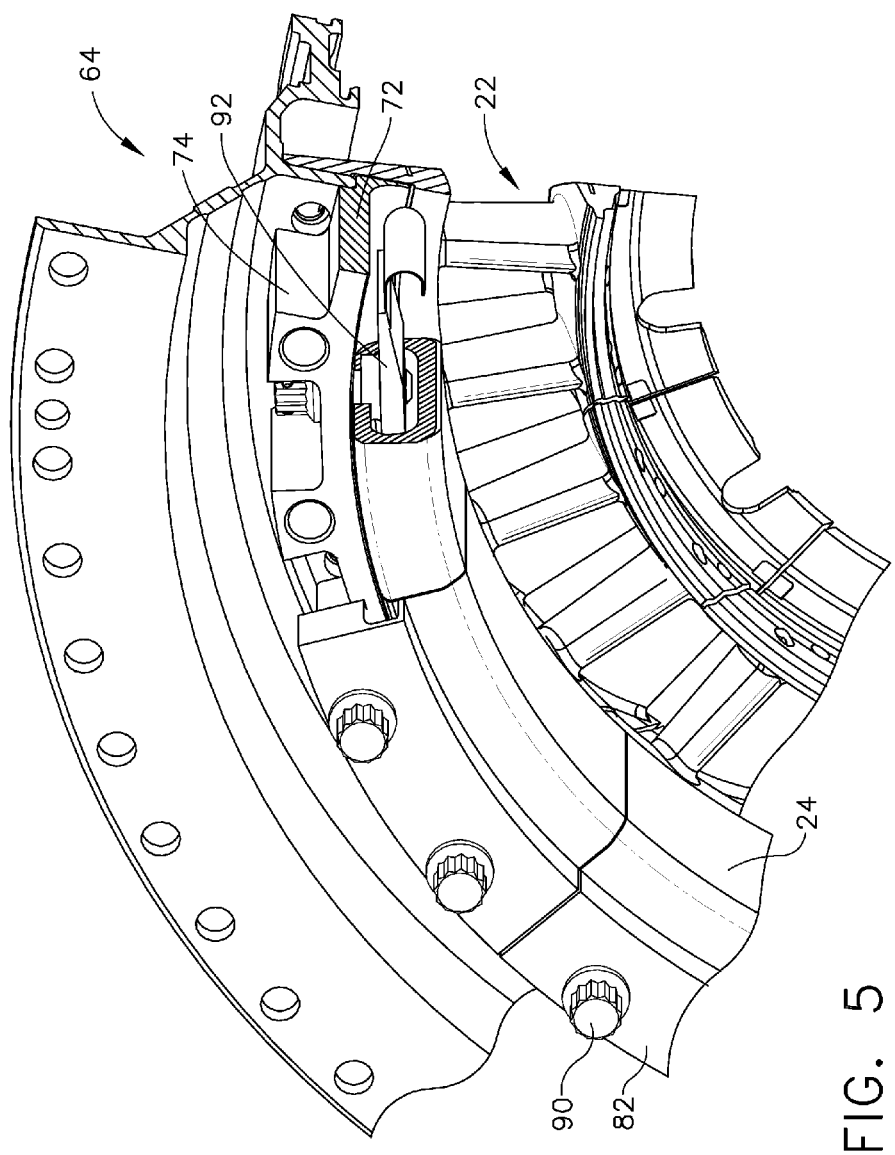
FIG. 5 is another perspective view of the turbine shroud assembly shown in FIG. 4.

Referring to FIGS. 3-5, the shroud segments 24 are mounted to a stationary engine structure constructed from suitable metallic alloys, e.g. nickel- or cobalt-based "superalloys". In this example the stationary structure is an annular turbine stator assembly 64 having (when viewed in cross-section) an axial leg 66, a radial leg 68, and an arm 70 extending axially forward and obliquely outward from the junction of the axial and radial legs 66 and 68.

An annular aft spacer 72 abuts against the forward face of the radial leg 68. The aft spacer 72 may be continuous or segmented. As best seen in FIGS. 4 and 5, it includes an array of generally axially-aligned, spaced-apart lands 74 which extend radially outward from a generally cylindrical body 76. It includes a flange 78 extending radially inward at its aft end. This flange 78 defines an aft bearing surface 80 (see FIG. 3). An axial fastener hole passes through each of the lands 74, and radial fastener holes pass through the body at the spaces between the lands 74.

A forward spacer 82, which may be continuous or segmented, abuts the forward end of the aft spacer 72. The forward spacer 82 includes a hook protruding radially inward with radial and axial legs 84 and 86, respectively. The hook defines a forward bearing surface 88.

As seen in FIG. 3, the turbine stator assembly 64, the flange 18 of the second stage nozzle, the aft spacer 72, and the forward spacer 82 are all mechanically assembled together, for example using the illustrated bolt and nut combination 90 or other suitable fasteners.

The shroud segments 24 are mechanically secured to the aft spacers 72 by an array of load spreaders 92 and bolts 94.

Figure 6:
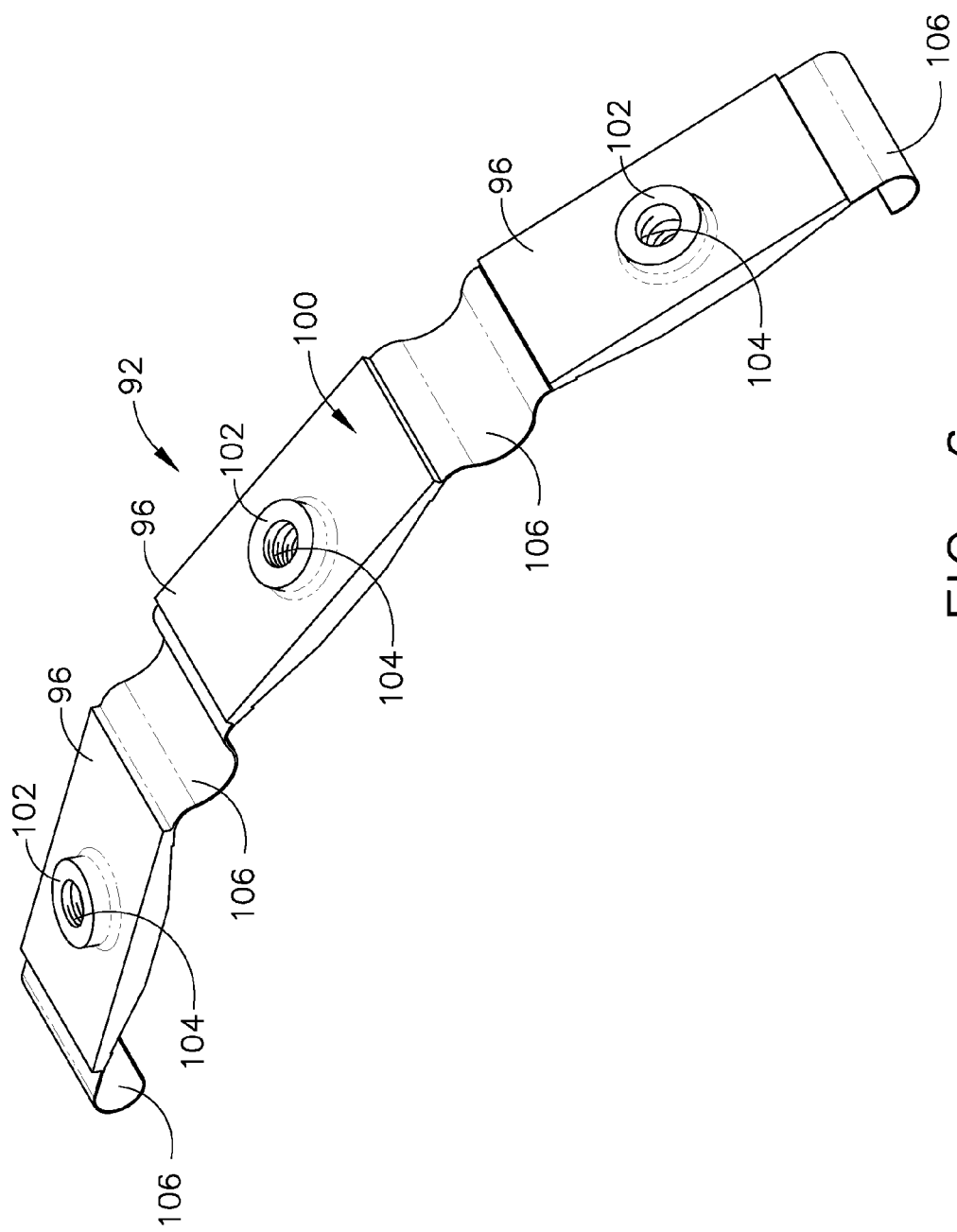
FIG. 6 is a perspective view of a load spreader.

The construction of the load spreaders 92 is shown in more detail in FIGS. 6, 7, and 8. Each load spreader 92 includes one or more plates 96, each having opposed inner and outer faces 98 and 100, with a generally cylindrical boss 102 extending radially outward from the outer face 100. A fastener hole 104 with integrally-formed threads passes through the boss 102. The plates 96 are interconnected by spring arms 106 which comprise thin, sheet-like elements. The spring arms 106 arc downward from the plates 96 (e.g. in a radially inward direction relative to the engine centerline A). The entire load spreader 92 may be constructed as an integral component. The total radial height "H1" from the spring arm 106 to the outer face 100 of the plate 96 is selected to be approximately equal to the radial height "H2" of the shroud cavity 56 (see FIG. 2). In the illustrated example, one load spreader 92 is provided for three shroud segments 24, and so the load spreader 92 includes three plates 96. The load spreaders 92 may be manufactured with a greater or fewer number of plates 96 to suit a particular application.

Referring to FIGS. 3 and 4, each shroud segment 24 is assembled to the aft spacer 72 by inserting a load spreader 92 into the interior of the shroud segment 24. The spring arms 106 are slightly compressed in the radial direction to allow insertion in to the shroud cavity 56. When the load spreader 92 is in position, the spring arms 106 expand and urge the plate 96 in a radially outboard direction, so as to hold the boss 102 in position within the mounting hole 54 in the shroud segment 24. The force exerted by the spring arms 106 has a small magnitude, on the order of a few pounds, and is provided solely to facilitate assembly. Bolts 94 (or other suitable fasteners) are then inserted through the aft spacer 72 and threaded into the fastener hole 104 of the load spreader 92. This configuration provides a substantially increased bearing surface as compared to using individual bolts passing directly through the shroud segments 12.

When the bolts 94 are torqued during assembly they draw the bosses 102 radially outward until the bosses 102 contact the aft spacer 72. This causes elastic bending of the laterally-extending portions of the plates 96, which in turn exert a radially-outward clamping preload against the shroud segment 24. The exact degree of preload in the radial direction depends not only on the effective spring constant of the plates 96, but also the relative dimensions of the load spreader 92 and the shroud segment 24, specifically on the radial height "H3" (see FIG. 8) of the boss 102 above the outer surface 100 as compared to the thickness "H4" (see FIG. 2) of the outer wall 42. If the height H3 is less than the thickness of the outer wall 42, there will be a radial clamping preload on the shroud segment 12, as described above. Alternatively, if the height H3 is greater than the thickness H4, the load spreader 92 will allow some static radial clearance, with little to no preload in the radial direction. In this sense its function will be similar to a conventional turbine shroud "hanger". It should be noted that the dimensions H3 and H4 are nominal dimensions and that their required values to achieve a particular radial clamping load or clearance will vary depending upon the presence of various grooves, slots, counterbores, etc. in the assembled components.

If desired, the shroud segment 24 may be restrained in the axial and lateral directions, by selection of the relative position and dimensional clearance of the bosses 102 relative to the mounting holes 54 in the outer walls 42 of the shroud segments 24

The material, sizing, and shapes of the components defining the forward and aft bearing surfaces 80 and 88 are selected so as to present substantially rigid stops against axial movement of the shroud segments 24 beyond predetermined limits, and may provide a predetermined compressive axial clamping load to the shroud segments 24 in a fore-and-aft direction.

Figure 12A:
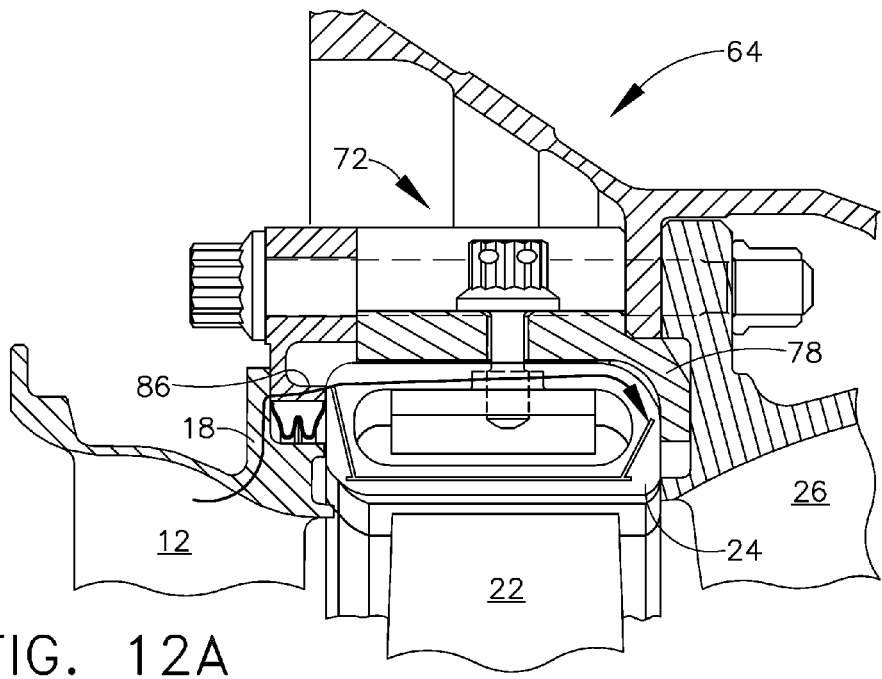
FIG. 12A is a schematic view depicting structural loads in the shroud assembly of FIG. 3.
Figure 12B:
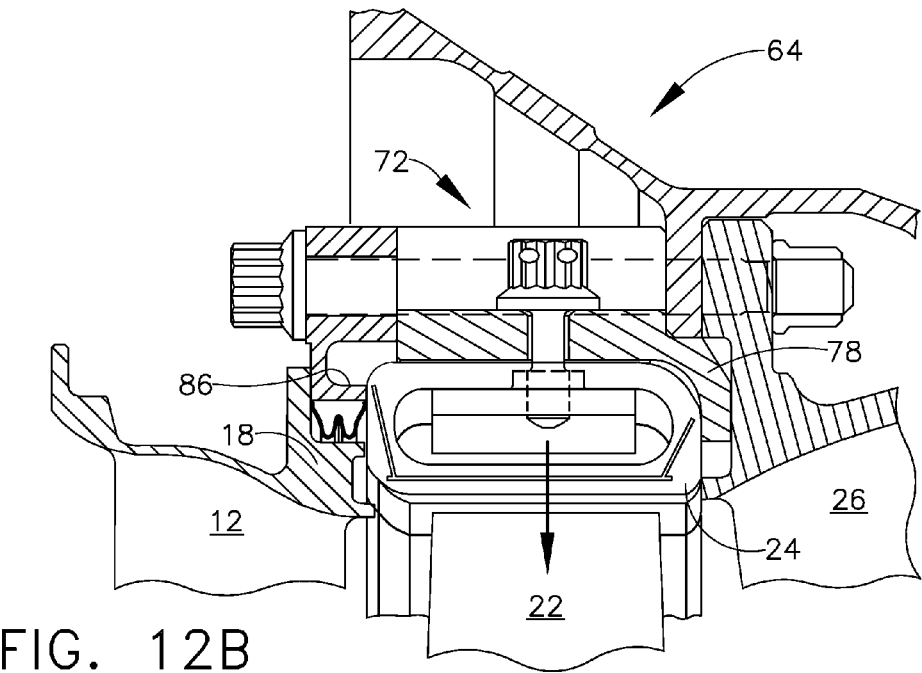
FIG. 12B is another schematic view depicting structural loads in the shroud assembly of FIG. 3.

In operation, the GGT components are subject to various loads. The shroud segments 24, being a complete "box" structure, are "structural" in the sense that they are physically capable of and installed in a manner so as to form part of a structural load path for these loads. FIGS. 12A and 12B illustrate these loads schematically. One significant load originates from air loads acting axially rearward on the first stage vanes 12. As shown by the heavy arrow in FIG. 12A, this axial load is transferred from the flange 18 of the first stage vanes 12 through the axial leg 86 of the forward spacer 82, through the shroud segment 24, and then to the flange 78 of the aft spacer 72. In other words, the shroud segment 24 is axially loaded in compression.

Another significant load is a radially inward force resulting from the pressure differential across the inner wall 40, resulting from flowpath air being at a lower static pressure than secondary air outboard of the shroud segment 24. This is shown by the heavy arrow in FIG. 12B. this load results in a tension load in the outer wall 42 of the shroud segment 24. Being a closed-loop box structure, the shroud segment 24 is capable of absorbing this load. The result is a reduction in bending stresses in the corners between the outer wall 42 and the forward and aft walls 44 and 46, respectively.

Appropriate means are provided for preventing air leakage from the combustion flowpath to the space outboard of the shroud segments 24. For example, an annular spring seal 108 or "W" seal of a known type may be provided between the flange 18 of the first stage outer band 16 and the shroud segments 24 (see FIG. 3). The aft end of the shroud segments bear against a sealing rail 110 of the second stage vanes 26. Other means to prevent leakage and provide sealing could be provided.

The use of CMC or similar material for the shroud segments 24 provides increased temperature capability as compared to metal alloys. As a result, prior art fluid systems designed to enhance convective properties of dedicated cooling air will not be required, and convective cooling may be reduced to near minimum levels in many applications. The shroud configuration described herein, consisting of a tightly sealed box cavity for minimal flow, achieves the lowest convective system properties available.

Figure 13:
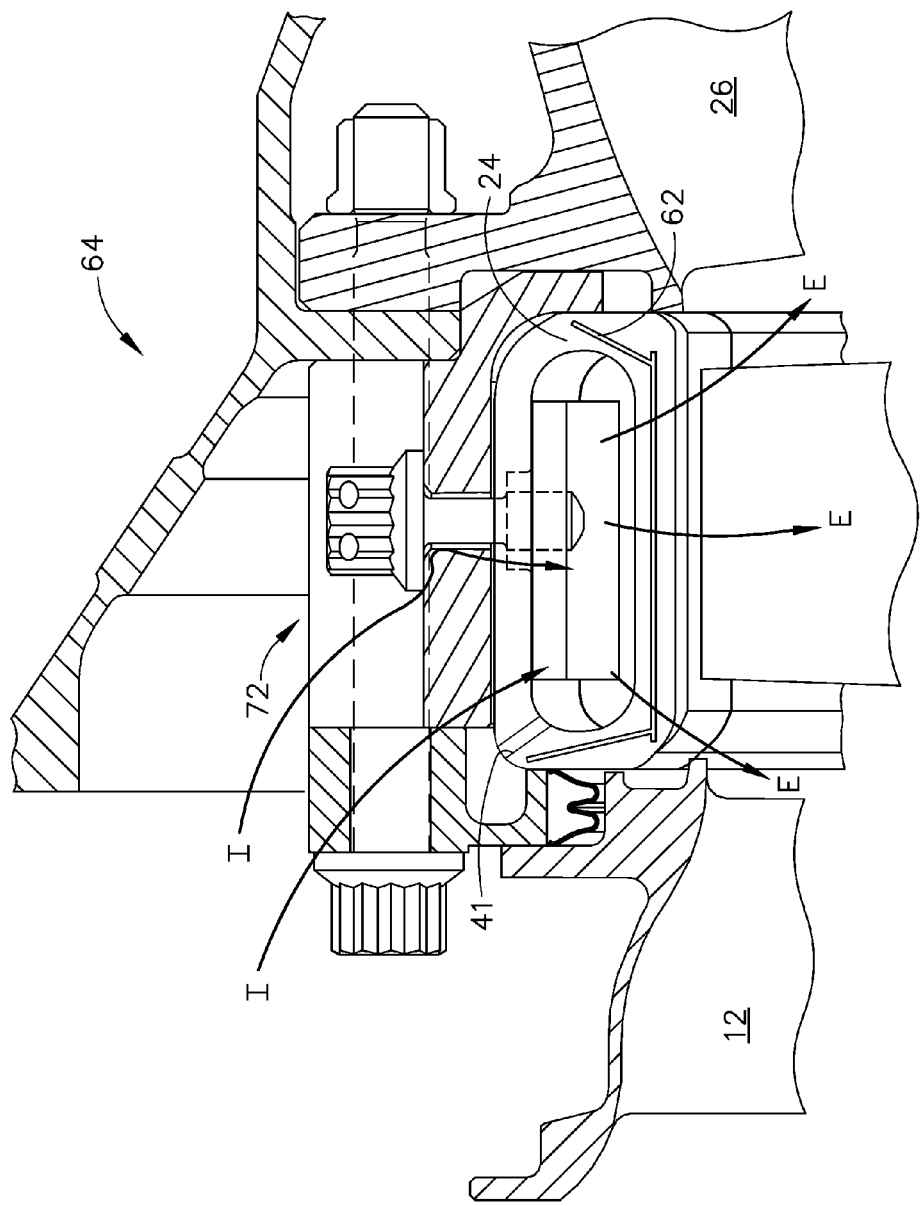
FIG. 13 is a schematic view showing cooling air flows through the shroud structure of FIG. 3.

Preferably, the interior surfaces of the walls 40, 42, 44, and 46 are substantially free of any heat transfer enhancement structures such as rough surface finishes, fins, slots, ridges, or turbulence promoters (i.e. "turbulators"). Any cooling required by the shroud segments 24 is achieved by providing the minimum amount of pressurization air needed to prevent ingestion of flowpath gasses leaking past the spline seals 62. As shown by the arrows labeled "I" in FIG. 13, cooling air may be provided to the shroud segments 24 by leakage through the end gaps between segments 24, by leakage through the mounting holes 54, or if necessary, through one or more separate orifices 41. As shown by the arrows labeled "E", the cooling air exits by leakage past the spline seals 62. By having a large open cavity with tight sealing, leakage flows and the resultant air velocities are minimized, thus minimizing the convective heat transfer coefficient on the inside surfaces of the shroud segment 24.

Figure 9:
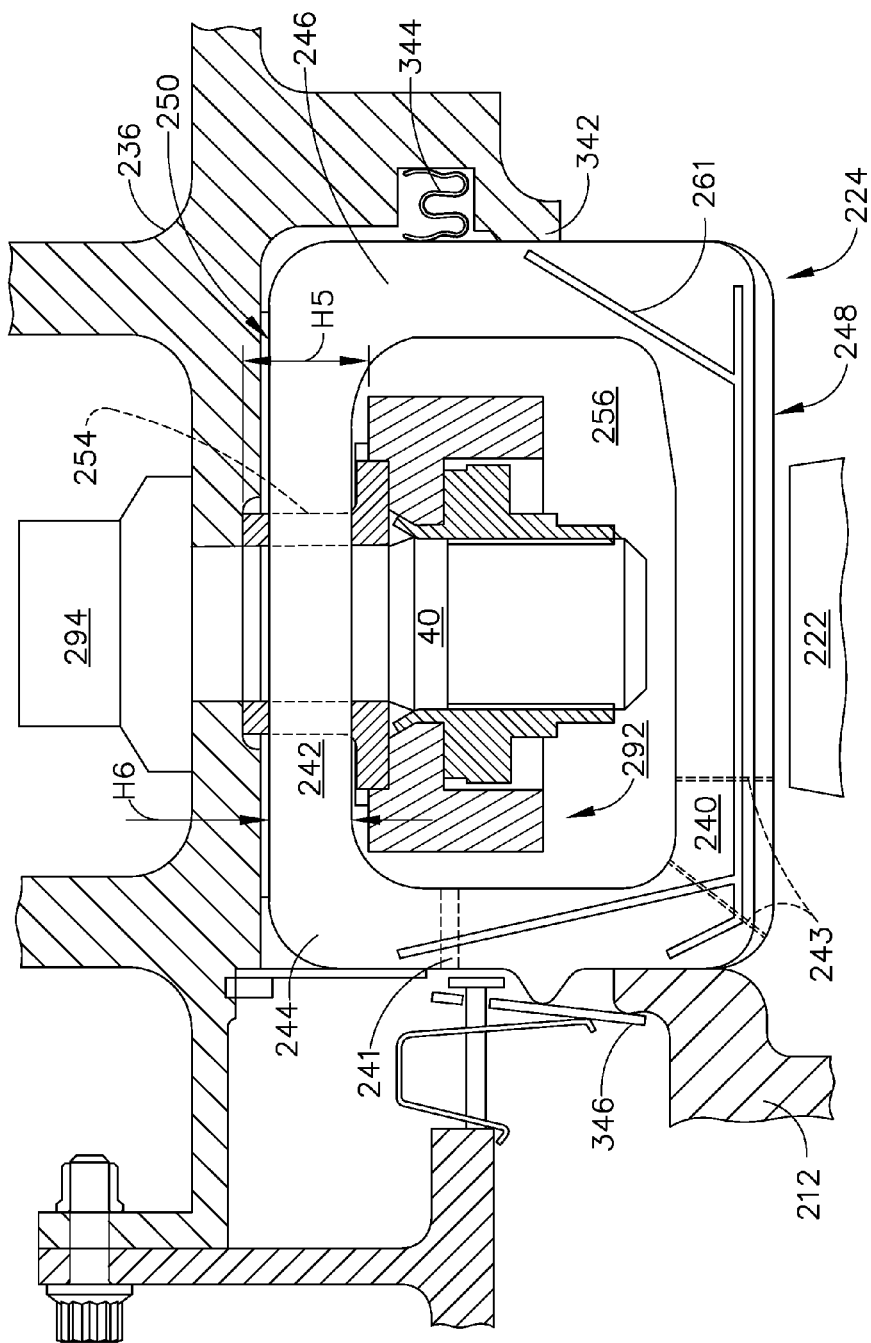
FIG. 9 is a schematic cross-sectional view of a portion of a turbine section of a gas turbine engine, incorporating an alternative turbine shroud assembly and mounting apparatus constructed in accordance with an aspect of the present invention.
Figure 10:
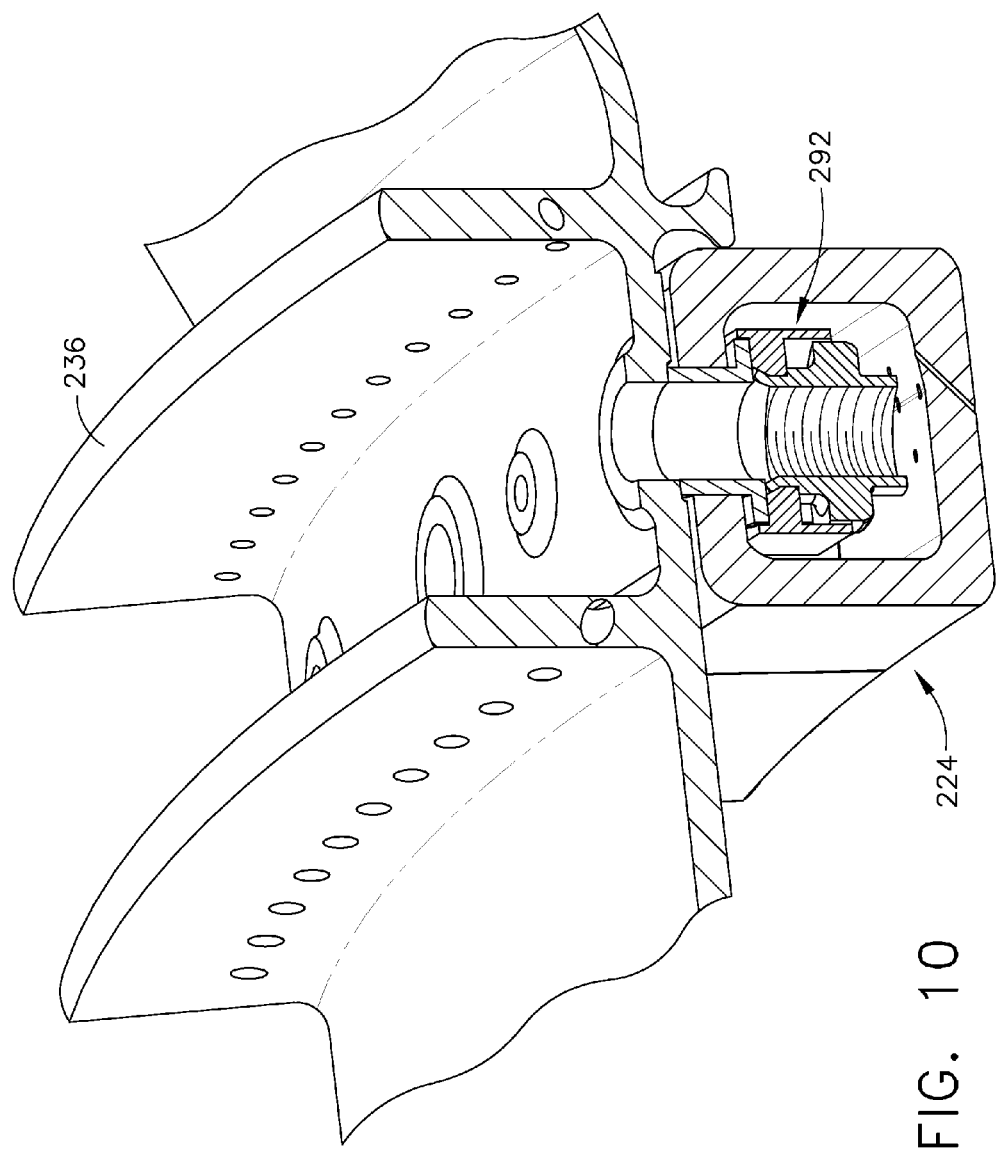
FIG. 10 is a perspective view of a portion of the turbine shroud assembly of FIG. 9.

FIGS. 9 and 10 illustrate an alternative turbine shroud structure constructed according to another aspect of the present invention. The shroud structure is part of a high pressure turbine ("HPT") which includes a nozzle 212 and a set of rotating turbine blades 222, generally similar in construction to the GGT described above, but having only a single stage. The HPT is typical of the configuration used in turbofan engines.

The turbine blades 222 are surrounded by a ring of low-ductility (e.g. CMC) shroud segments 224. The shroud segments 224 are similar in construction to the shroud segments 24 described above and include inner, outer, forward, and aft walls 240, 242, 242, and 246, respectively, as well as a flowpath surface 248 and a back surface 250. A shroud cavity 256 is defined inside the walls. Mounting holes 254 are formed through the outer walls 242. The end faces may include slots 261 for spline seals of the type described above. The shroud segments 224 are mounted to a stationary structure, which in this example is part of a turbine case 236, by bolts 294 and load spreaders 292 (the bolts 294 are not shown in FIG. 10).

Figure 11:
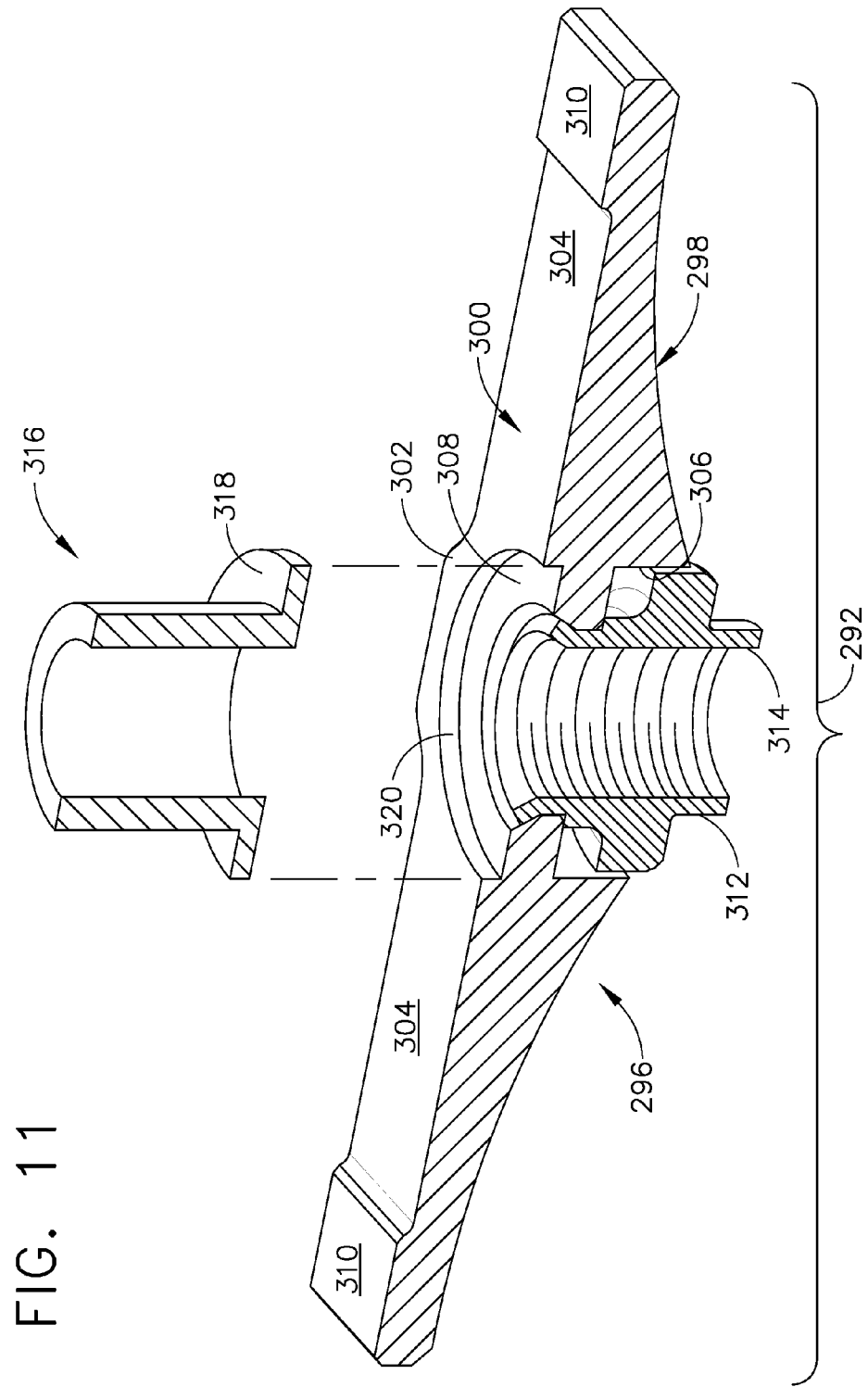
FIG. 11 is an exploded perspective view of a load spreader.

The construction of the load spreaders 292 is shown in more detail in FIG. 11. Each load spreader 292 includes a plate 296, each having opposed inner and outer faces 298 and 300. The plate has a central portion 302 with two laterally-extending arms 304. A radially-aligned bore 306 with an inwardly-extending flange 308 is provided in the middle of the central portion 302. The distal end of each arm 304 includes a flat pad 310 which protrudes above the outer face 300. A generally tubular insert 312 is swaged or otherwise secured to the bore 306 and includes a threaded fastener hole 314. Depending on the construction and dimensions of the load spreader 92, it may be possible to form the threaded fastener hole 314 directly in the structure without the use of the insert 312. In the illustrated example, one load spreader 292 is provided for one shroud segment 224, The load spreaders 292 may be manufactured with a greater or fewer number of plates 296 to suit a particular application.

A generally tubular spacer 316 with an annular flange 318 is received in a shallow counterbore 320 in the central portion 320. Functionally, the spacer 316 corresponds to and constitutes a boss as described above. The separate spacer 316 permits insertion of the load spreaders 292 into the shroud cavities 256. Depending on the particular application, the radial height of the shroud cavity may be sufficient to allow a load spreader without a separate spacer.

Referring back to FIGS. 9 and 10, each shroud segment 224 is assembled to the turbine case 236 by inserting a load spreader 292 into the interior of the shroud segment 224, after the spacers (or bosses) 316 are inserted into the mounting holes 254. Optionally, the load spreader 292 may be provided with a spring element as described above to hold the spacers 316 in position within the mounting holes 254 during assembly.

When the bolts 294 are torqued during assembly they draw the load spreaders 292 radially outward until the spacers 316 contact the turbine case 236. This causes elastic bending of the arms 304, which in turn exert a radially-outward clamping preload against the shroud segment 224. The presence of the pads 310 provide a consistent contact area and insure that the effective spring constant of the arms 304 remains predictable As with the load spreaders 92 described above, the exact degree of preload in the radial direction depends not only on the effective spring constant of the arms 304, but also the relative dimensions of the load spreader 292 and the shroud segment 224, specifically on the radial height "H5" of the spacer 316 above the surface of the pads 310 as compared to the thickness "H6" of the outer wall 242 (see FIG. 9). If the height H5 is less than the thickness H6 of the outer wall 242, there will be a radial clamping preload on the shroud segment 224, as described above. Alternatively, if the height H5 is greater than the thickness H6, the load spreader 292 will allow some static radial clearance, with little to no preload in the radial direction. In this sense its function will be similar to a conventional turbine shroud "hanger". It should be noted that the dimensions H5 and H6 are described in a nominal configuration, and that their required values to achieve a particular radial clamping load or clearance will vary depending upon the presence of various grooves, slots, counterbores, etc. in the assembled components.

In this particular example, the case 236 includes a flange 342 which projects radially inward and bears against the aft wall 246 of the shroud segment 224. The flange 342 carries an annular "W" seal 344 which reduces leakage between the aft wall 246 and the flange 342. A leaf seal 346 or other circumferential seal of a conventional type is mounted forward of the shroud segment 224 and bears against the forward wall 244. It is noted that FIG. 9 illustrates only one particular mounting configuration, and that the sealing principles and apparatus described herein may be used with any type of shroud segment mounting structure.

Figure 14:
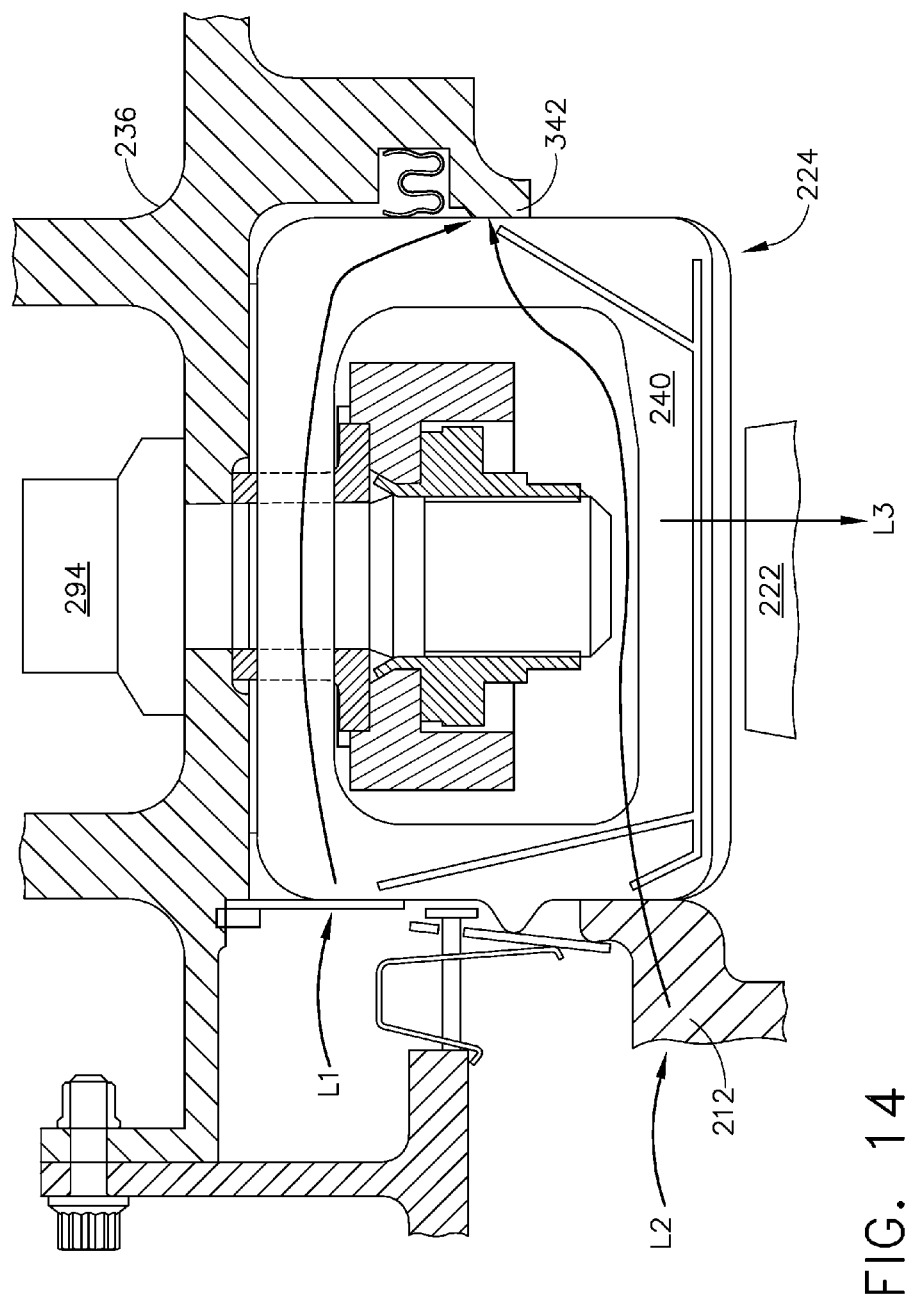
FIG. 14 is a schematic view depicting structural loads in the shroud assembly of FIG. 9.

As with the shroud segments 24, the shroud segments 224 define a complete "box" and are "structural" in the sense that they are physically capable of and installed in a manner so as to form part of a structural load path for these loads. FIG. 14 illustrates these loads schematically. Significant loads include air loads "L1" acting axially rearward on the first stage vanes 12, and axial pressure loads "L2" acting axially rearward on the shroud segments 224. As shown by the heavy arrows, these axial loads are transferred through the shroud segment 24, and then to the flange 342 of the turbine case 236. The shroud segment 224 also absorbs a radially inward force "L3" resulting from the pressure differential across the inner wall 240.

As with the shroud segments 24, it is preferable that the interior surfaces of the walls 240, 242, 244, and 246 are substantially free of any heat transfer enhancement structures such as rough surface finishes, fins, slots, ridges, or turbulence promoters (i.e. "turbulators"). Any cooling required by the shroud segments 24 is achieved by providing the minimum amount of pressurization air needed to prevent ingestion of flowpath gasses leaking past the spline seals in slots 261. Cooling air may be provided to the shroud segments 224 by leakage through the end gaps between segments 224, by leakage through the mounting holes 254, or if necessary, through one or more separate orifices 241 (see FIG. 9). The cooling air exits by leakage past the spline seals. If necessary or desired for a particular application, film cooling holes 243 may be provided through the walls of the shroud segment 224.

The mounting apparatus and configurations described above provide for secure mounting of CMC or other low-ductility turbine shroud components. They transfer loads out of the turbine nozzle and transmit them into the case without the use of additional components. This arrangement has the added benefit of extra sealing between the nozzle and the shroud, which can improve the overall efficiency of the engine. The shroud architecture described herein, including a tightly sealed box cavity for minimal flow, achieves the lowest convective system properties available. Any cooling required by the low-ductility material is achieved by the minimum amount of pressurization air needed to prevent ingestion of flowpath gasses. By having a large open cavity with tight sealing, leakage flows and the resultant air velocities are minimized thus minimizing the convective heat transfer coefficient on the inside surfaces of the shroud.

The foregoing has described a structural low-ductility turbine shroud apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine shroud apparatus for a gas turbine engine having a central axis, comprising:
 an arcuate shroud segment comprising low-ductility material and having a cross-sectional shape defined by opposed forward and aft walls, and opposed inner and outer walls, the walls extending between opposed first and second end faces and collectively defining a shroud cavity;
 a turbine vane disposed upstream of the shroud segment and arranged such that there is a continuous mechanical load path from the turbine vane to the forward wall of the shroud segment;
 an annular stationary structure surrounding the shroud segment, where the shroud segment is mechanically coupled to the stationary structure, and wherein the stationary structure includes at least one axially-facing bearing surface which is in direct contact with the aft wall of the shroud segment; and a load spreader received in the shroud cavity of the shroud segment and mechanically coupled to the stationary structure, the load spreader comprising:
  a laterally-extending plate with opposed inner and outer faces; and
  a boss which protrudes radially from the outer face and extends through a mounting hole in the outer wall of one of the shroud segments; and
  a fastener engaging the boss and the stationary structure, so as to clamp the boss against the stationary structure in a radial direction;
wherein the shroud segment is disposed so as to absorb at least one axially-aligned force from the turbine vane and transfer the axially-aligned force to the bearing surface.

2. The apparatus of claim 1 wherein a portion of the vane is in direct contact with the forward wall of the shroud segment.

3. The apparatus of claim 1 further including a spacer disposed between the turbine vane and the shroud segment, the spacer defining a portion of the continuous mechanical load path from the turbine vane to the forward wall of the shroud segment.

4. The apparatus of claim 1 wherein the load spreader includes arms extending laterally outwardly from a central portion.

5. The apparatus of claim 1 wherein the dimensions of the shroud segment and the load spreader are selected such that when the boss is clamped against the stationary structure, the plate is deflected elastically so as to apply a predetermined preload against the outer wall.

6. The apparatus of claim 1 wherein the dimensions of the shroud segment and the load spreader are selected such that when the boss is clamped against the stationary structure, the plate is deflected elastically so as to permit a predetermined radial clearance between the load spreader and the outer wall.

7. The apparatus of claim 1 wherein the stationary structure includes substantially rigid annular forward and aft bearing surfaces which bear against the forward and aft walls, respectively, of the shroud segment, so as to restrain the shroud segment from axial movement relative to the stationary structure.

8. The apparatus of claim 1 wherein the stationary structure comprises:
  an annular turbine stator;
  an annular aft spacer including a flange extending radially inward at its aft end, which defines an axially-facing aft bearing surface; and
  a forward spacer including a hook protruding radially inward which defines an axially-facing forward bearing surface.

9. The apparatus of claim 1 wherein the shroud segment comprises a ceramic matrix composite material.

10. The turbine shroud apparatus of claim 1, wherein:
  an annular array of the arcuate shroud segments is disposed with the end faces of adjacent shroud segments in sealing relationship to each other;
  the annular stationary structure surrounds the array of shroud segments; and
  flowpaths are defined for cooling air to enter and exit the shroud cavity.

11. The apparatus of claim 10 wherein the entry flowpath comprises a gap through a mounting hole formed in the outer walls of the shroud segments.

12. The apparatus of claim 10 wherein the entry flowpath comprises gaps between adjacent shroud segments.

13. The apparatus of claim 10 wherein the entry flowpath comprises an orifice formed through one of the walls of the shroud segments.

14. The apparatus of claim 10 wherein the walls of the shroud segments are substantially free from any heat transfer enhancement structure.

15. The apparatus of claim 10 wherein the exit flowpath comprises gaps between adjacent shroud segments.

16. The apparatus of claim 10 wherein the exit flowpath comprises film cooling holes formed through one of the walls of the shroud segments.

17. The apparatus of claim 10 wherein the shroud segments comprise a ceramic matrix composite material.

18. The apparatus of claim 10 wherein the end faces of each shroud segment includes slots which receive one or more spline seals therein, the spline seals spanning gaps between adjacent shroud segments.

* * * * *